(12) United States Patent
Kawada et al.

(10) Patent No.: US 7,508,414 B2
(45) Date of Patent: Mar. 24, 2009

(54) TRANSMITTED-PICTURE QUALITY MONITORING APPARATUS

(75) Inventors: Ryoichi Kawada, Saitama (JP); Atsushi Koike, Saitama (JP)

(73) Assignee: KDDI Corporation, Tokyo (JP)

( * ) Notice: Subject to any disclaimer, the term of this patent is extended or adjusted under 35 U.S.C. 154(b) by 588 days.

(21) Appl. No.: 11/208,542

(22) Filed: Aug. 23, 2005

(65) Prior Publication Data

US 2006/0044392 A1 Mar. 2, 2006

(30) Foreign Application Priority Data

Aug. 25, 2004 (JP) ............................ 2004-245067

(51) Int. Cl.
*H04N 17/00* (2006.01)
(52) U.S. Cl. ...................... 348/192; 348/180
(58) Field of Classification Search ................ 348/180, 348/192, 193, 184; 702/57–59, 69–78, 81; 382/100, 190, 207
See application file for complete search history.

(56) References Cited

U.S. PATENT DOCUMENTS

| | | | |
|---|---|---|---|
| 5,274,446 A * | 12/1993 | Ashida | 348/192 |
| 5,574,500 A * | 11/1996 | Hamada et al. | 348/180 |
| 6,075,561 A * | 6/2000 | Janko | 348/180 |
| 6,236,756 B1 * | 5/2001 | Kimura et al. | 382/239 |
| 6,239,834 B1 * | 5/2001 | Miyaji et al. | 348/193 |
| 6,246,435 B1 * | 6/2001 | Patel | 348/192 |
| 6,496,221 B1 * | 12/2002 | Wolf et al. | 348/192 |
| 6,577,764 B2 * | 6/2003 | Myler et al. | 382/228 |
| 6,943,827 B2 * | 9/2005 | Kawada et al. | 348/180 |
| 2002/0149675 A1 * | 10/2002 | Abraham et al. | 348/192 |
| 2002/0176002 A1 * | 11/2002 | Kawada et al. | 348/192 |

FOREIGN PATENT DOCUMENTS

| | | |
|---|---|---|
| JP | 2003-009186 | 1/2003 |
| JP | 2003-087823 | 3/2003 |

* cited by examiner

*Primary Examiner*—Victor R Kostak
(74) *Attorney, Agent, or Firm*—Westerman, Hattori, Daniels & Adrian, LLP.

(57) ABSTRACT

Picture quality characteristic amounts are extracted with a picture quality characteristic amount extractor and are transmitted to a central monitoring room to monitor a transmitted-picture quality. The picture quality characteristic amount extractor includes a pixel-position interchanger, an orthogonal transformer and a coefficient extractor. The picture quality characteristic amount extrator may further include a PN-series multiplier.

6 Claims, 2 Drawing Sheets

[0,0] [0,1] [0,2] [0,3]
[1,0] [1,1] [1,2] [1,3]
[2,0] [2,1] [2,2] [2,3]
[3,0] [3,1] [3,2] [3,3]

[0,0]->[3,1] [0,1]->[2,1] [0,2]->[0,0] [0,3]->[2,0]
[1,0]->[3,0] [1,1]->[3,3] [1,2]->[2,3] [1,3]->[0,1]
[2,0]->[2,2] [2,1]->[0,2] [2,2]->[1,0] [2,3]->[1,3]
[3,0]->[3,2] [3,1]->[0,3] [3,2]->[1,1] [3,3]->[1,2]

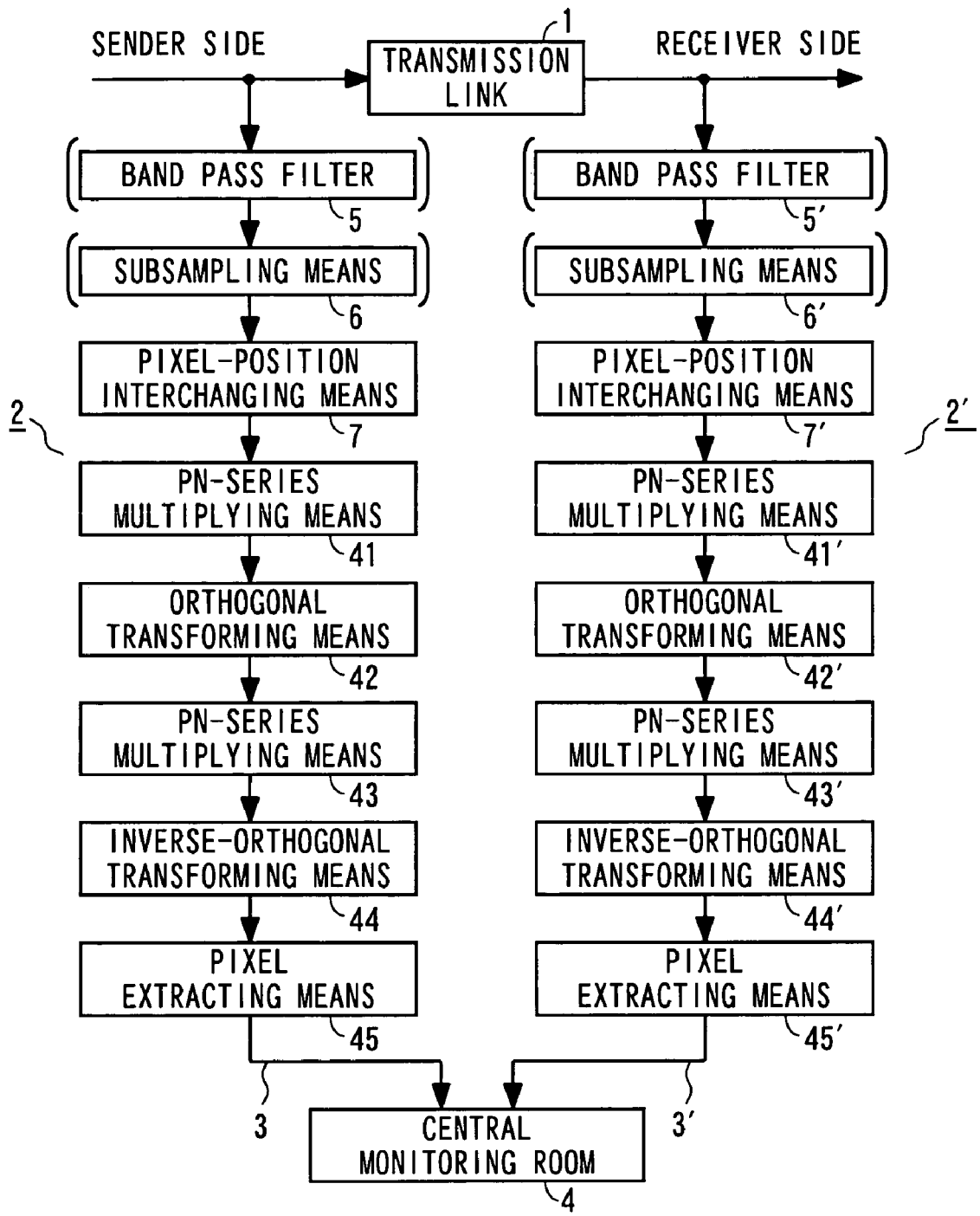

TRANSMITTED-PICTURE QUALITY MONITORING APPARATUS

BACKGROUND OF THE INVENTION

1. Field of the Invention

The present invention relates to a transmitted-picture quality monitoring apparatus and more particularly, to a transmitted-picture quality monitoring apparatus for monitoring the transmitted-picture quality on a transmission chain from a remote place by extracting the picture quality characteristic amount at each point on the transmission link and comparing the extracted picture quality characteristic amount.

2. Description of the Related Art

When monitoring a transmitted-picture quality on a transmission link comprising transmission chain, the picture quality characteristic amount at any point on the transmission link are extracted, and the extracted picture quality characteristic amount are transmitted to a central monitoring room and compared so as to monitor remotely the transmitted-picture quality on a transmission link in batch.

The inventors et al. have proposed a transmitted-picture quality monitoring apparatus for monitoring the transmitted-picture quality on a transmission link in patent documents 1 and 2. According to this transmitted-picture quality monitoring apparatus, a picture is divided into blocks with a certain size, an arbitrary transform coefficient is extracted from transform coefficients obtained by orthogonal transform of the picture of each block, and is transmitted to a central monitoring room as a picture quantity characteristic amount. This transmitted-picture quality monitoring apparatus exerts its effect especially when as described in the patent documents 1 and 2, spectrum spreading is applied to the picture and then that picture is orthogonally transformed and the transform coefficient is extracted and transmitted. The spread spectrum is realized by randomly changing the sign of each pixel constituting the picture.

Patent document 1: Japanese Patent Application Laid-Open No. 2003-009186

Patent document 2: Japanese Patent Application Laid-Open No. 2003-087823

In the inventions proposed in the above-described patent documents 1 and 2, the transform coefficients obtained by orthogonal transform are randomized, that is, a spectrum is randomized by the spectrum spreading in order to enhance a tendency for the transform coefficient arbitrarily extracted to represent the whole picture from a statistical view. Thereby, the picture quality characteristic amount can be transmitted to the central monitoring room, using a low-speed transmission link and at the same time, a transmitted-picture quality can be monitored with high accuracy.

SUMMARY OF THE INVENTION

An object of the present invention is to provide a transmitted-picture quality monitoring apparatus for monitoring a transmitted-picture quality with high accuracy without using a spectrum spreading, and, moreover, for monitoring the transmitted-picture quality with further high accuracy when the spectrum spreading is simultaneously used.

In order to accomplish the object, the first feature of this invention is that a transmitted-picture quality monitoring apparatus for monitoring a transmitted-picture quality on a transmission link comprising a transmission chain, said transmitted-picture quality monitoring apparatus comprises picture quality characteristic amount extracting means for extracting picture quality characteristic amount at a plurality of points on the transmission link, and a comparing means for comparing the picture quality characteristic amount extracted with the picture quality characteristic amount extracting means, wherein the picture quality characteristic amount extracting means includes a pixel-position interchanging means for interchanging pixel-positions on a picture on the transmission link, and a selecting means for selecting arbitrary pixels among output of the pixel-position interchanging means as the picture quality characteristic amount.

Also, the second feature of this invention is that the transmitted-picture quality monitoring apparatus, wherein the picture quality characteristic amount extracting means includes an orthogonal transforming means for transforming orthogonally the output of the pixel-position interchanging means, and the selecting means selects arbitrary coefficients, instead of the pixels, among the output of the orthogonal transforming means as the picture quality characteristic amount.

Also, the third feature of this invention is that the transmitted-picture quality monitoring apparatus, wherein the picture quality characteristic amount extracting means includes a spectrum spreading means for spreading the spectrum of the output of the pixel-position interchanging means, and the selecting means selects arbitrary pixels among the output of the spectrum spreading means as the picture quality characteristic amount.

Also, the fourth feature of this invention is that the transmitted-picture quality monitoring apparatus, wherein the comparing means is provided in a central monitoring room, and the picture quality characteristic amount, which has been extracted with the picture quality characteristic amount extracting means, is transmitted to the central monitoring room through a low-speed transmission link.

As the apparatus according to the present invention is provided with the pixel-position interchanging means for interchanging at random the positions on pixels on an input picture, that is, for changing the pixel-coordinates in one-to-one random correspondence, arbitrary selecting among the pixels interchanged by the pixel-position interchanging means, or transform coefficients after orthogonal transform can have similar statistical effects to selecting among pixels after spectrum spreading or transform coefficients after orthogonal transform. Accordingly, the picture quality characteristic amount can be transmitted to the central monitoring room, using a low-speed transmission link, and, at the same time, the transmitted-picture quality can be monitored with high accuracy.

Moreover, as a tendency for the pixel or the transform coefficient, which is arbitrarily extracted, to represent the whole picture quality from a statistical view is further enhanced when the spectrum spreading is simultaneously used, the transmitted-picture quality can be further precisely monitored when the spectrum spreading is simultaneously used.

BRIEF DESCRIPTION OF THE DRAWINGS

FIG. 4 is a block diagram showing the second embodiment of a transmitted-picture quality monitoring apparatus according to the present invention.

DETAILED DESCRIPTION OF THE PREFERRED EMBODIMENTS

Figures 1, 2, 3:
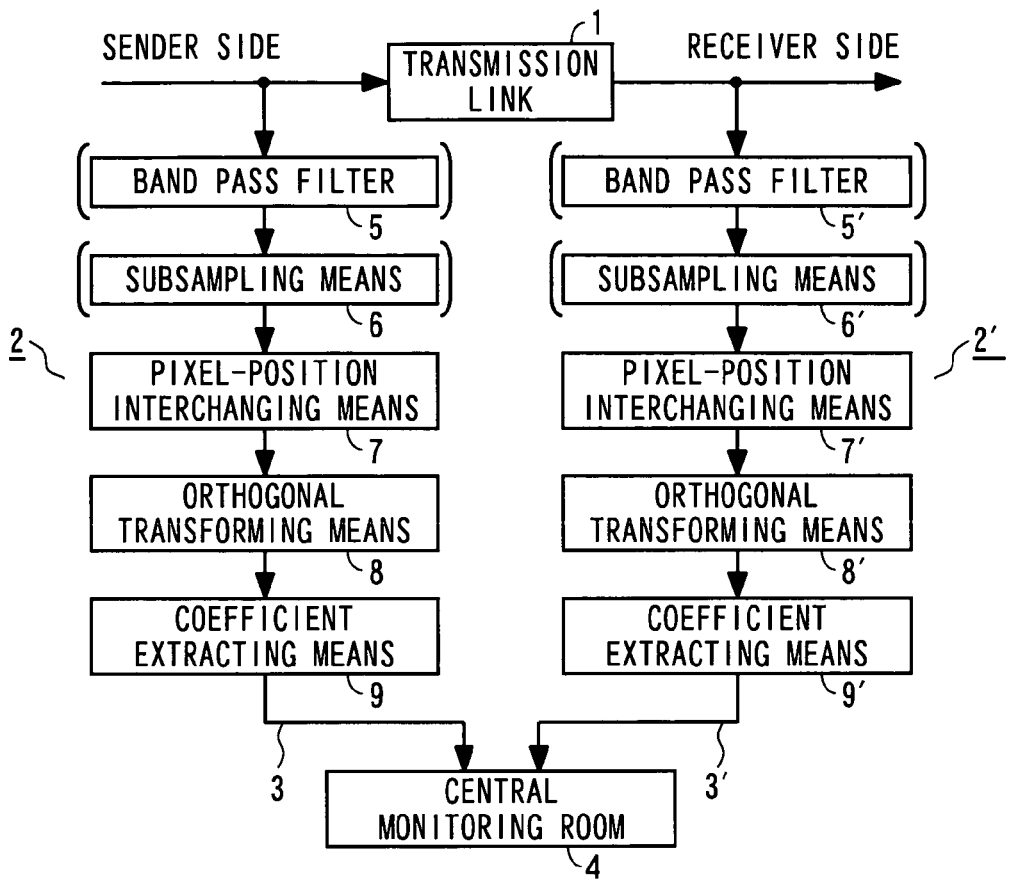
FIG. 1 is a block diagram showing a first embodiment of a transmitted-picture quality monitoring apparatus according to the present invention.
FIG. 2 is a view showing coordinates for pixel-positions (four pixels wide, and three lines high)
FIG. 3 is a view showing an example in which pixel-positions are randomly interchanged.

First, a principle of the present invention will be explained. Usually, a picture spectrum has more power in lower frequencies. Accordingly, orthogonal transform of the picture causes comparatively high correlation among transform coefficients. As described in the patent documents 1 and 2, pixels or transform coefficients are extracted as the picture quality characteristic amount of the picture at each point on a transmission link through which the pictures are transmitted are whitened, the picture quality characteristic amount are transmitted to a central monitoring room for comparison, and the mean square error (MSE) between the pictures can be estimated. Accordingly, the transmitted-picture quality can be monitored with high accuracy by transmitting of a small number of pixels, or transform coefficients.

According to the patent document 1, a PN-series multiplying means is provided for the above whitening, and signs are randomly changed by multiplying the picture by a series in which +1 and −1 are randomly arranged. But, in the present invention, whitening of a picture can be realized without multiplying of the PN-series by interchanging the pixel-positions at random with a pixel-position interchanging means, that is, by changing the pixel-coordinates in one-to-one random correspondence. The principle of the present invention has been described above.

Hereinafter, the present invention will be explained in detail with reference to the accompanying drawings. FIG. 1 is a block diagram showing a first embodiment of a transmitted-picture quality monitoring apparatus according to the invention. A transmission link 1 comprises a transmission chain. A picture quality characteristic amount extracting means 2 is provided at the sender side, and a picture quality characteristic amount extracting means 2' is provided at the receiver side of the transmitting link 1. The picture quality characteristic amount is extracted from the picture transmitted on the transmission link 1. The picture quality characteristic amount extracted with the picture quality characteristic amount extracting means 2 is transmitted to a central monitoring room 4 through a monitoring transmission link 3, and the picture quality characteristic amount extracted with the picture quality characteristic amount extracting means 2' is transmitted to the central monitoring room 4 through a monitoring transmission link 3'.

As the picture quality characteristic amount extracting means 2 at the sender side and that at the receiver side have the same configuration as each other, only the picture quality characteristic amount extracting means 2 will hereinafter be explained. The picture quality characteristic amount extracting means 2 processes pictures input from the transmission link 1 every field as follows.

First, a picture is input to a pixel-position interchanging means 7 through a band pass filter 5 and a subsampling means 6. The band pass filter 5 and the subsampling means 6 are provided as required, and are not necessarily required.

The band pass filter 5 is, for example, a time-space filter simulating human visual characteristics, and a picture quality deterioration can be estimated with weighting according to the human visual characteristics, with processing using the time-space filter. A two-dimensional digital filter can be used as the band pass filter 5. A configuration in which filtering is performed according to the human visual characteristics, using the two dimensional digital filter, has been described in, for example, "Picture-Motion Estimating Apparatus", JP-A No. 7-307925.

Moreover, the subsampling means 6 reduces calculating loads by decreasing data amount for which calculation is required. As the filtering and the subsampling have been described in the patent document 1 and 2, the explanation will not be given hereinafter.

The pixel-position interchanging means 7 randomly interchanges the pixel-positions on a field of the picture. In this interchanging, the pixel-position interchanging means 7 at the sender side and the pixel-position interchanging means 7' at the receiver side are required to have the same configuration.

Assuming for simplification of the explanation that a screen size is four pixels wide and four lines high, sixteen-pixel-position-coordinates as shown in FIG. 2. Interchanging of these pixel-positions at random means, for example, that the pixel-positions are interchanged as shown in FIG. 3.

Arbitrary pixels are selected from a pixel set in which the pixel-positions are interchanged as described above, and the selected pixels may be transmitted to the central monitoring room 4 as the picture quality characteristic amount. But, in the present embodiment, the pixel set is input to an orthogonal transforming means 8 for transforming orthogonally each block with an arbitrary size, transform coefficients are obtained, and a coefficient extracting means 9 extracts arbitrary transform coefficients for each block to decide the extracted coefficients as the picture quality characteristic amount.

The Fast Fourier transform (FFT) or the Walsh Hadamard transform (WHT) can be used for the orthogonal transform. Physically, FFT is the most accurate transform method from frequency spectrum viewpoints, and, information amount transmitted to the central monitoring room 4 can be reduced if a real part and an imaginary part are not picked up, but only an amplitude value is picked up when an arbitrary frequency component is picked up.

Moreover, as all the operations in WHT are an addition operation or a subtraction operation, WHT has a merit that calculation becomes simple, even if realized with hardware, or with software.

The central monitoring room 4 compares the picture quality characteristic amount, which have been extracted with the picture quality characteristic amount extracting means 2 at the transmitting side and have been transmitted to the central monitoring room 4, and those, which have been extracted with the picture quality characteristic amount extracting means 2' at the receiving side and have been transmitted to the central monitoring room 4. Thereafter, the transmitted picture quality on the transmission link 1 is monitored in the central monitoring room 4 by estimating the mean square error (MSE) of the pictures between the transmitting side and the receiving side. Estimation based on the mean square error (MSE) has been also described in the patent documents 1 and 2 in detail, and detailed explanation will not be given.

As the pixel-positions are randomly interchanged in the first embodiment as described above, the MSE-based estimation can be performed with high accuracy by extraction of a small number of the pixels or the transform coefficients. Accordingly, a low-speed transmission link can be used for the monitoring transmission links 3 and 3'.

FIG. 4 is a block diagram showing the second embodiment of a transmitted-picture quality monitoring apparatus according to the present invention. In the drawing, portions which are the same as, or similar to those of FIG. 1 are denoted by the same reference numbers as those in FIG. 1. The second embodiment differs from the first one in a point that a PN-series multiplying means 41, other than a pixel-position interchanging means 7, is provided, and whitening is performed by the both means 7 and 41.

Hereinafter, the point different from the first embodiment will be explained. A pixel set output from a pixel-position interchanging means 7 is multiplied by a PN-series in the PN-series multiplying means 41. Thereby, the signs of the pixels in the pixel set output from the pixel-position interchanging means 7 are randomly changed. As the PN-series, and the multiplication of the PN-series have been described in the patent document 1, detailed explanation will not be given.

Though arbitrary pixels are selected from a pixel set in which pixel-positions are interchanged and, at the same time, the signs of the pixels are changed at random as described above, and the selected pixels may be transmitted to the central monitoring room 4 as a picture quality characteristic amount, a picture quality characteristic amount is extracted according to the after-described processing in this embodiment, following the above processing.

First, the output of the PN-series multiplying means 41 is input to an orthogonal transforming means 42 to apply orthogonal transform for each block with an arbitrary size and to obtain transform coefficients of each block.

Next, the transform coefficients are further input to a PN-series multiplying means 43, in which the signs of each transform coefficient are randomly changed by multiplying the transform coefficients by the PN-series in a transform coefficient area.

Next, inverse-orthogonal transform is performed by an inverse-orthogonal transforming means 44. The inverse-orthogonal transform here means inverse transform of the orthogonal transform in the orthogonal transforming means 42. The inverse-orthogonal transform is inverse-FFT when the orthogonal transform in the orthogonal transforming means 42 is FFT, and inverse-WHT when the orthogonal transform is WHT. Here, the size of the circuit can be reduced in the case of WHT because the inverse transform matrix and the normal transform matrix have the same configuration.

Finally, a pixel extracting means 45 extracts an arbitrary number of pixels for the above-described blocks, and sends the extracted pixels to a central monitoring room 4 as the picture quality characteristic amount. In the central monitoring room 4, the transmitted-picture quality on a transmission link 1 is monitored by estimating the mean square error (MSE) of the pictures between the transmitting side and the receiving side in a similar manner to that of the first embodiment.

As multiplying of the transform coefficients by the PN-series (the signs of each transform coefficient are randomly changed), other than the random interchanging of pixel-positions, is performed in the second embodiment as described above, whitening (spectrum spreading) can be more effectively executed, and the transmitted-picture quality on the transmission link 1 can be monitored with further high accuracy. Moreover, it is effective for whitening to multiply transform coefficients by a PN-series a plurality of times as described in the second embodiment, including processing in a transform coefficient area.

Here, pixel-positions may be randomly interchanged a plurality of times. For example, the random interchanging of pixel-positions may further be performed between the PN-series multiplying means 41 and the orthogonal transforming means 42. Moreover, the random interchanging of transform coefficients can be performed in a transform coefficient area, for example, between the orthogonal transforming means 42 and the PN-series multiplying means 43, or between the PN-series multiplying means 43 and the inverse-orthogonal transforming means 44. For this interchanging, a configuration of the transmitting side and that of the receiving side are required to be the same as each other.

What is claimed is:

1. A transmitted-picture quality monitoring apparatus for monitoring a transmitted-picture quality on a transmission link comprising a transmission chain, said transmitted-picture quality monitoring apparatus comprising:
    picture quality characteristic amount extracting means for extracting a picture quality characteristic amount at a plurality of points on the transmission link; and
    a comparing means for comparing the picture quality characteristic amount extracted with the picture quality characteristic amount extracting means,
    wherein the picture quality characteristic amount extracting means includes a pixel-position interchanging means for interchanging pixel-positions on a picture on the transmission link, and a selecting means for selecting arbitrary pixels among output of the pixel-position interchanging means as the picture quality characteristic amount.

2. The transmitted-picture quality monitoring apparatus according to claim 1, wherein
    the picture quality characteristic amount extracting means includes an orthogonal transforming means for transforming orthogonally the output of the pixel-position interchanging means, and
    the selecting means selects arbitrary coefficients, instead of the pixels, among the output of the orthogonal transforming means as the picture quality characteristic amount.

3. The transmitted-picture quality monitoring apparatus according to claim 1, wherein
    the picture quality characteristic amount extracting means includes a spectrum spreading means for spreading the spectrum of the output of the pixel-position interchanging means, and
    the selecting means selects arbitrary pixels among the output of the spectrum spreading means as the picture quality characteristic amount.

4. The transmitted-picture quality monitoring apparatus according to claims 1, wherein
    the comparing means is provided in a central monitoring room, and
    the picture quality characteristic amount, which has been extracted with the picture quality characteristic amount extracting means, is transmitted to the central monitoring room through a low-speed transmission link.

5. The transmitted-picture quality monitoring apparatus according to claims 2, wherein
    the comparing means is provided in a central monitoring room, and
    the picture quality characteristic amount, which has been extracted with the picture quality characteristic amount extracting means, is transmitted to the central monitoring room through a low-speed transmission link.

6. The transmitted-picture quality monitoring apparatus according to claims 3, wherein
    the comparing means is provided in a central monitoring room, and
    the picture quality characteristic amount, which has been extracted with the picture quality characteristic amount extracting means, is transmitted to the central monitoring room through a low-speed transmission link.

* * * * *